US012637365B2

(12) United States Patent
　Bersani

(10) Patent No.:　US 12,637,365 B2
(45) Date of Patent:　　May 26, 2026

(54) METHOD FOR TREATING WASTEWATER FOR THE RECOVERY OF METALS CONTAINED THEREIN, AND APPARATUS FOR SUCH A METHOD

(71) Applicant: CIRCULAR MATERIALS S.R.L., Cambiago (IT)

(72) Inventor: Marco Bersani, Padua (IT)

(73) Assignee: CIRCULAR MATERIALS S.R.L., Cambiago (IT)

( * ) Notice: Subject to any disclaimer, the term of this patent is extended or adjusted under 35 U.S.C. 154(b) by 449 days.

(21) Appl. No.: 17/774,624

(22) PCT Filed: Oct. 29, 2020

(86) PCT No.: PCT/EP2020/080375
§ 371 (c)(1),
(2) Date: May 5, 2022

(87) PCT Pub. No.: WO2021/089403
PCT Pub. Date: May 14, 2021

(65) Prior Publication Data
US 2022/0371916 A1　　Nov. 24, 2022

(30) Foreign Application Priority Data
Nov. 7, 2019　(IT) ........................ 102019000020530

(51) Int. Cl.
*C02F 1/02*　　　　(2023.01)
*C02F 1/52*　　　　(2023.01)
(Continued)

(52) U.S. Cl.
CPC ................. *C02F 1/02* (2013.01); *C02F 1/52* (2013.01); *C22B 3/44* (2013.01); *C02F 2101/20* (2013.01);
(Continued)

(58) Field of Classification Search
None
See application file for complete search history.

(56) References Cited

U.S. PATENT DOCUMENTS 5,571,423 A * 11/1996 Daman ................ B01J 19/2415
　　　　　　　　　　　　　　　　　588/317
2017/0297941 A1 　 10/2017 　Wang et al.

FOREIGN PATENT DOCUMENTS

KR 　　 20100006008 A 　 * 　 1/2010

OTHER PUBLICATIONS

International Search Report issued Dec. 18, 2020 re: Application No. PCT/EP2020/080375, pp. 1-3, citing: KR 2010 0006008 A and US 2017/0297941 A.

(Continued)

*Primary Examiner* — Krishnan S Menon
(74) *Attorney, Agent, or Firm* — CANTOR COLBURN LLP

(57) ABSTRACT

An apparatus for treating wastewater, for the recovery of metals contained therein, includes
　a first pump,
　a second pump, and a
　heating element, of which the input is connected to the first pump and the output to a mixer.
The mixer, of which a first input is connected to the heating element, a second input to the second pump, and an output to a cooling element,
　the input of the cooling element being connected to the mixer and the output to a depressurization component.
The input of the depressurization component is connected to the cooling element and the output to liquid/solid separation element.
The input of the liquid/solid separation component is connected to the depressurization component.

6 Claims, 1 Drawing Sheet

(51) Int. Cl.
    *C02F 101/20*     (2006.01)
    *C02F 103/16*     (2006.01)
    *C22B 3/44*     (2006.01)

(52) U.S. Cl.
    CPC ....  *C02F 2103/16* (2013.01); *C02F 2301/066*
                                (2013.01)

(56)               References Cited

OTHER PUBLICATIONS

Written Opinion issued Dec. 18, 2020 re: Application No. PCT/EP2020/080375, pp. 1-7, citing: KR 2010 0006008 A and US 2017/0297941 A.
European Office Action for European Application No. 20796606.0, dated Feb. 21, 2024, 6 pages.
Canadian Office Action for Application No. 3,155,800, dated Oct. 17, 2025, 4 pages.
Mexican Office Action for Application No. MX/a/2022/005504, dated Dec. 9, 2025, 14 pages with translation.

* cited by examiner

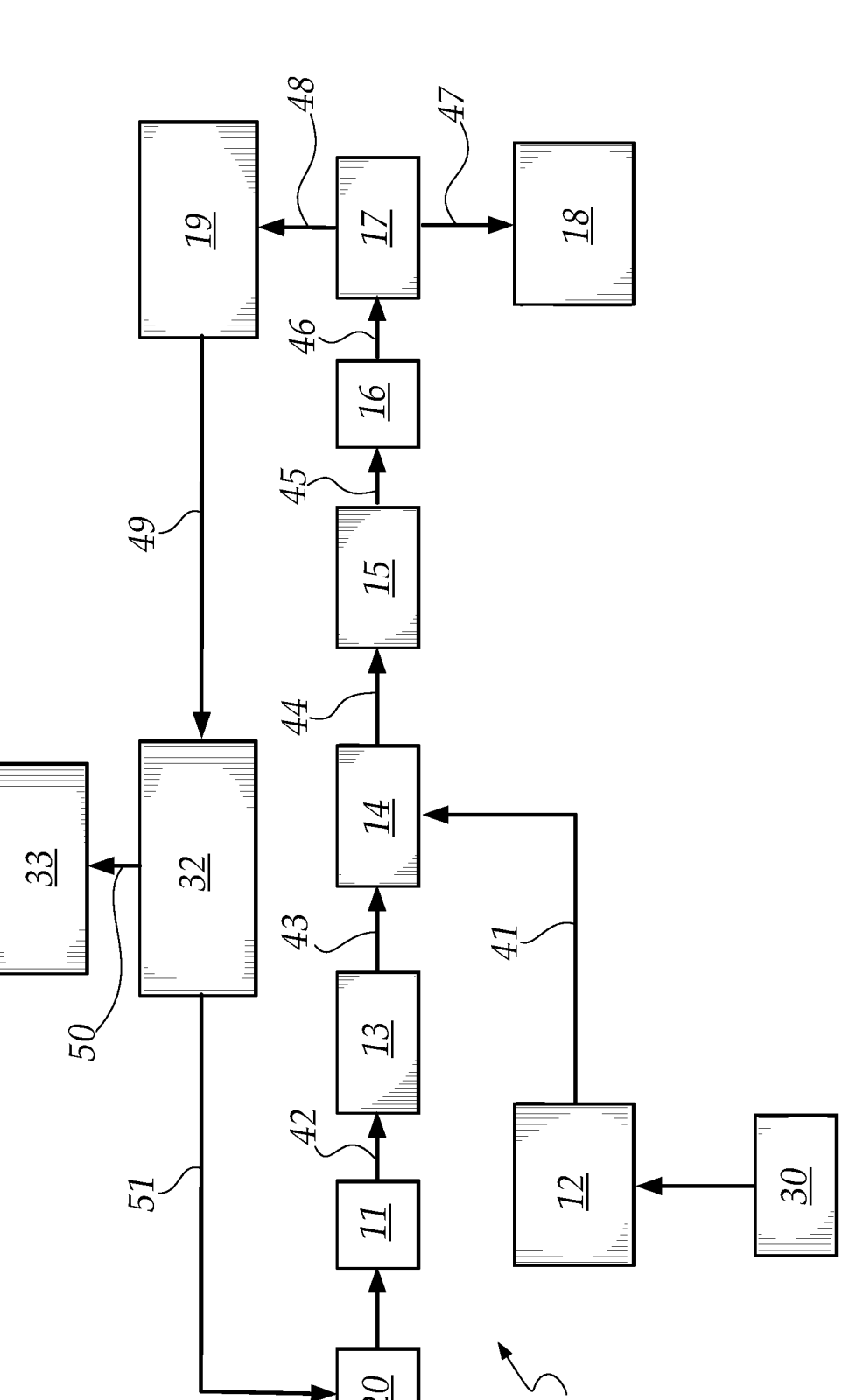

METHOD FOR TREATING WASTEWATER FOR THE RECOVERY OF METALS CONTAINED THEREIN, AND APPARATUS FOR SUCH A METHOD

TECHNICAL FIELD

The present disclosure relates to a method for treating wastewater, for the recovery of metals contained therein.

The disclosure also relates to an apparatus for carrying out such a method.

BACKGROUND

Nowadays, in the production processes of various industrial sectors, wastewater is generated, i.e. water that is polluted after use in the industrial process.

Many of these waters contain various types of metal, in some cases even valuable metals, such as gold and silver, or metals that are widely used and are of great interest, like copper, aluminum or nickel.

This is the case with wastewater from industrial processes such as, for example, electroplating and/or anodizing and/or chemical plating (electroless plating).

One of the problems associated with these types of wastewater is the problem of recovering the metals contained in them, generally in the form of chemical compounds dissolved as ions or inorganic or metalorganic complexes, which in some cases can reach considerable quantities, but which currently are difficult to extract from the wastewater.

Nowadays, to recover the above mentioned metals, processes of the electrolytic type or ion exchanges with resins are used.

Such conventional techniques have a number of drawbacks.

These techniques, in fact, are expensive and uncomfortable, and their use is advantageous only for recovering valuable metals or metals that are important for industrial use.

Even for valuable metals, however, the process has a maximum efficacy of around 90%, and beyond this threshold the value of the recovered metal does not justify the process costs.

Also, metals recovered with such techniques are not always directly usable in new industrial production processes, but often need to be subjected to further treatments (incineration of the resins) and/or electrochemical refinement steps.

For non-valuable metals and metals that are more widespread in industry it is often more convenient, for the companies that produce the wastewater, to proceed directly with disposal without recovering the metal contained therein.

In these cases the disposal occurs with chemical/physical processes where, in order to reduce the level of toxicity within legal limits and meet the parameters for disposal in landfill, it is necessary to treat the waters with processes of acidification/basification, coagulation/flocculation, adsorption and finally precipitation with the addition of lime, the purpose of which is to dilute the metal and render it inert.

The result is muds which typically are sent for discharge, with consequent exit from the production cycle of the metals contained therein.

The water produced after the separation of the mud containing the metals have other organic pollutants in the form of compounds of carbon, phosphor, nitrogen, sulfur and halides, which require further treatments with biological processes before they can be discharged into sewers or into surface water bodies.

For wastewater deriving from the surface treatment industry, of particular importance is the high level of COD (Chemical Oxygen Demand), linked to the heavy presence of surfactants and dispersants used in the process.

For example, in Italy this limit is 160 mg/L (for outflow into surface water bodies) and 500 mg/L (for outflow into the sewerage network).

The result obtained is muds from which, in some cases, the metals are extracted using chemical solvents and/or electrochemical processes.

Even these known techniques have the drawback of being expensive and inconvenient, and their use is advantageous only for recovering valuable metals or metals that are important for industrial use/interest.

Furthermore, such techniques make it possible to recover only a minimal part of the metals present, and the metals recovered are not always directly usable in new industrial production processes, but often need to be subjected to further steps.

For this reason, management of the disposal is also complex and uncomfortable, and the costs are high.

SUMMARY

The aim of the present disclosure is to provide a method for treating wastewater, for the recovery of metals contained therein and an apparatus for carrying out such method, which are capable of improving the known art in one or more of the above mentioned aspects.

Within this aim, the disclosure provides a method for treating wastewater, for the recovery of metals contained therein, that is more economical and straightforward with respect to similar, conventional methods.

The disclosure develops a method for treating wastewater, for the recovery of metals contained therein, that enables greater recoveries of metals than can be obtained with similar, conventional methods.

The disclosure devises a method for treating wastewater, for the recovery of metals contained therein, that makes it possible to obtain metals that can be used directly in new industrial production processes, without the need for further steps.

The disclosure also develops a method for treating wastewater, for the recovery of metals contained therein, that makes it possible to obtain, after the removal of these metals, water that has a COD that is such as to meet the limits set by law and can be disposed of by discharging into sewers.

Finally, the disclosure further provides an apparatus for carrying out a method that makes it possible to achieve the above mentioned objectives.

The present disclosure overcomes the drawbacks of the background art in an alternative manner to any existing solutions.

The disclosure also provides a method for treating wastewater, for the recovery of metals contained therein, and an apparatus for carrying out such method that are highly reliable, easy to implement and of low cost.

This aim and these and other advantages which will become better apparent hereinafter are achieved by providing a method for treating wastewater, for the recovery of metals contained therein, characterized in that the method comprises the following steps:

mixing in a turbulent manner a stream of said wastewater at supercritical pressure with a stream of process water under analogous pressure conditions and pericritical and/or supercritical temperature conditions, causing the precipitation of the dissolved metals and the obtainment of a suspension of powders of metals in water, cooling said suspension, obtaining a cooled suspension, depressurizing said cooled suspension, obtaining a depressurized suspension, separating the solid from the liquid in said depressurized suspension, obtaining a solid that contains said metals and purified water, drying said solid, thus recovering said metals.

This aim and these and other objects which will become better apparent hereinafter are achieved by an apparatus for treating wastewater, for the recovery of metals contained therein, characterized in that it comprises:

a first pump, a second pump, heating means, of which the input is connected to said first pump and the output to a mixer, said mixer, of which a first input is connected to said heating means, a second input to said second pump, and an output to cooling means, the input of said cooling means being connected to said mixer and the output to depressurization means, the input of said depressurization means being connected to said cooling means and the output to liquid/solid separation means, the input of said liquid/solid separation means being connected to said depressurization means.

BRIEF DESCRIPTION OF THE DRAWING

Further characteristics and advantages of the disclosure will become better apparent from the detailed description that follows of a preferred, but not exclusive, embodiment of the method for treating wastewater, for the recovery of metals contained therein, and of an apparatus, according to the disclosure, which are illustrated by way of non-limiting example in the accompanying drawings wherein:

FIG. 1 is a diagram of a method for treating wastewater, for the recovery of metals contained therein, according to the disclosure, and of an apparatus for carrying out such method, according to the disclosure.

DETAILED DESCRIPTION OF THE DRAWING

With reference to the FIGURE, an apparatus for a method for treating wastewater for the recovery of metals contained therein, according to the disclosure, is generally designated by the reference numeral 10.

The apparatus 10 comprises:

a first pump, 11, for process water 20, a second pump, 12, for wastewater 30 to be treated for the recovery of metals contained therein, heating means 13, of which the input is connected to the first pump 11 and the output to a mixer 14, the mixer 14, of which a first input is connected to the heating means 13, a second input to the second pump 12, and an output to cooling means 15, the input of the cooling means 15 being connected to the mixer 14 and the output to depressurization means 16, the input of the depressurization means 16 being connected to the cooling means 15 and the output to liquid/solid separation means 17, the input of the liquid/solid separation means 17 being connected to the depressurization means 16.

The various elements of the apparatus 10 are connected via tubes of a type per se known.

In some embodiments, the elements of the apparatus 10 can be accommodated in a module, not shown in the figures, in order to improve compactness and reduce encumbrances.

The heating means 13 are constituted, for example, by a heat exchanger with electric resistance heaters.

The mixer 14 is of the type described in Italian Patent application 102019000000979 dated 23 Jan. 2019 by the company PARTICULAR MATERIALS SRL.

Such cooling means 15 are constituted, for example, by a heat exchanger of the "tube-in-tube" type.

The above mentioned depressurization means 16 are represented, for example, by a backpressure regulator.

The liquid/solid separation means 17, are, for example, filtration and/or decanting and/or centrifuging means.

In the present description, the expression "critical pressure" means the pressure at the critical point.

The expression "critical point" means, in the present description, the point at which the conditions of maximum temperature and maximum pressure (respectively "critical temperature" and "critical pressure") occur, such that a substance can exist as a biphasic gas-liquid mixture.

The expression "supercritical conditions", in the present description, means conditions of temperature and pressure that are higher, respectively, than the critical temperature and critical pressure values.

For water:

the critical temperature is equal to about 375° C., the critical pressure is equal to about 221 bar.

The expression "pericritical conditions", in the present description, means temperature and pressure conditions in a neighborhood of the critical point, for which the physical and chemical properties (density, dielectric constant, thermal conductivity, viscosity) of the medium display appreciable variations from normal conditions, relative to mechanisms of precipitation of the metals owing to supersaturation on reduced solubility.

The term "suspension", in the present description, means a mixture of solid elements, in this case metals, dispersed in a liquid, in this case water.

The method for treating wastewater 30 and the recovery of metals 18 contained therein, according to the disclosure, is the following and entails the following steps:

sending a stream of wastewater 30, with a pressure greater than the critical pressure, to the mixer 14, through the second pump 12, arrow 41, thus obtaining a stream of wastewater 30 at supercritical pressure, simultaneously, sending a stream of process water 20 with a pressure substantially greater than the critical pressure, by way of the first pump 11, to the heating means 13, arrow 42, heating the stream of process water 20 to a substantially pericritical and/or supercritical temperature, thus obtaining a stream of process water 20 under pericritical and/or supercritical conditions, sending the flow of process water 20 under pericritical and/or supercritical conditions into the mixer 14, arrow 43, mixing in a turbulent manner, inside the mixer 14, the stream of wastewater 30 at supercritical pressure with the stream of process water 20 under pericritical and/or supercritical conditions, causing a sudden precipitation of the dissolved soluble substances, including the metals 18, thus obtaining a suspension of metals 18 in water 19, sending this suspension to the cooling means 15, arrow 44, cooling this suspension through the cooling means 15, obtaining a cooled suspension, sending this cooled suspension to the depressurization means 16, arrow 45, depressurizing this cooled suspension through the depressurization means 16, obtaining a depressurized suspension, sending this depressurized suspension to the liquid/solid separation means, arrow 46, separating the solid from the liquid in the depressurized suspension, obtaining a solid that contains metals 18 (arrow 47) and purified water 19 (arrow 48), drying said solid obtained, thus recovering the metals 18.

The expression "purified water", in the present description, refers to the water obtained by the process liquid/solid separation, after the removal of the solid.

The purified water 19 can be subjected to further treatments by way of treatment means 32 (arrow 49), thus obtaining treated water, before being discharged into sewers and/or into landfill 33 (arrow 50).

It is also possible to use a suitable fraction of the treated water as process water 20 (arrow 51), thus reducing and, potentially, eliminating the consumption of clean water.

Also, it is possible to have a heat recovery cycle between the heating means 13 and the cooling means 15 in order to improve the energy efficiency of the entire method.

The two pumps 11 and 12, like all of the process, operate at the same pressure, controlled by the depressurization means 16.

The method according to the disclosure is preferably carried out under a continuous flow regimen, i.e. uninterrupted, as this enables a more efficient thermal management of the method, thus keeping down costs.

It should be noted that, with the method according to the disclosure, considerable quantities of metals can be recovered, even in the order of 99.9% of the metals present.

This is not possible with similar methods known today.

Furthermore, with a method according to the disclosure metals can be recovered that can be straightforwardly and quickly reused in industrial production processes and do not necessitate further treatments.

Finally, it should also be noted that a method according to the disclosure makes it possible to reduce the COD of the wastewater, even below the regulation threshold limits for disposal in sewers.

In practice it has been found that the disclosure fully achieves the intended aim and objects, by devising a method for treating wastewater, for the recovery of metals contained therein, that is more economical and straightforward with respect to similar, conventional methods.

It should be noted that a method according to the disclosure can be used for the recovery of metals that currently it is not economically viable to recover with conventional processes.

With the disclosure a method has been developed for treating wastewater, for the recovery of metals contained therein, that enables a greater recovery of metals than can be obtained with similar, conventional methods.

In addition, with the disclosure a method has been devised for treating wastewater, for the recovery of metals contained therein, that makes it possible to obtain metals that can be used directly in new industrial production processes, without the need for further steps.

In addition, with the disclosure a method has been developed for treating wastewater, for the recovery of metals contained therein, that makes it possible to obtain, after the removal of these metals, water that has a COD that is such as to meet the limits set by law and can be disposed of by discharging into sewers.

Finally, with the disclosure an apparatus has been provided for carrying out a method that makes it possible to achieve the above mentioned objectives.

The disclosure thus conceived is susceptible of numerous modifications and variations, all of which are within the scope of the appended claims Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102019000020530 from which this application claims priority are incorporated herein by reference.

The invention claimed is:

1. A method for treating wastewater for the recovery of metals contained therein, the method comprising the following steps:

providing a mixer, sending a stream of said wastewater at supercritical pressure into said mixer and simultaneously sending a stream of clean process water at a supercritical pressure and at a pericritical and/or supercritical temperature into said mixer, mixing in a turbulent manner said stream of wastewater at supercritical pressure with said stream of clean process water at supercritical pressure and pericritical and/or supercritical temperature in said mixer, and causing a precipitation of dissolved metals and an obtainment of a suspension of powders of metals in water, sending said suspension from an output of said mixer directly to an input of a cooling means and cooling said suspension, obtaining a cooled suspension, sending said cooled suspension from an output of said cooling means directly to an input of a depressurization means and depressurizing said cooled suspension, obtaining a depressurized suspension, sending said depressurized suspension from an output of said depressurization means directly to an input of a liquid/solid separation means and separating the solid from the liquid in said depressurized suspension, obtaining a solid that contains said metals and purified water, and drying said solid, thus recovering said metals.

2. The method according to claim 1, further includes the following steps:

treating said purified water in order to be able to dispose of it, obtaining treated water, and disposing of said treated water by discharging it into sewers and/or into landfill, wherein the method uses a fraction of said treated water as clean process water.

3. The method according to claim 1, wherein the method uses a fraction of said treated water as clean process water.

4. The method according to claim 1, further comprising a cycle for recovering heat between:

heating means configured for heating said stream of process water under pericritical and/or supercritical conditions, and the cooling means for cooling said suspension.

5. The method according to claim 1, being performed under a continuous flow regimen.

6. A method for treating wastewater for the recovery of metals contained therein, the method comprising the following steps:

providing a mixer, sending a stream of said wastewater at supercritical pressure into said mixer and simultaneously sending a stream of clean process water at a supercritical pressure and at a pericritical and/or supercritical temperature into said mixer, mixing in a turbulent manner said stream of wastewater at supercritical pressure with said stream of clean process water at supercritical pressure and pericritical and/or supercritical temperature in said mixer, and causing a precipitation of dissolved metals and an obtainment of a suspension of powders of metals in water, sending said suspension from an output of said mixer directly to an input of a cooling means and cooling said suspension, obtaining a cooled suspension, sending said cooled suspension from an output of said cooling means directly to an input of a depressurization means and depressurizing said cooled suspension, obtaining a depressurized suspension, sending said depressurized suspension from an output of said depressurization means directly to an input of a liquid/solid separation means and separating the solid from the liquid in said depressurized suspension, obtaining a solid that contains said metals and purified water, and drying said solid, thus recovering said metals, wherein the method uses a fraction of said treated water as clean process water.

\* \* \* \* \*